United States Patent
Huang

(10) Patent No.: US 7,665,217 B2
(45) Date of Patent: Feb. 23, 2010

(54) LASER LEVEL ASSEMBLY

(75) Inventor: Eric Huang, Suzhou (CN)

(73) Assignee: Black & Decker Inc., Newark, DE (US)

( * ) Notice: Subject to any disclaimer, the term of this patent is extended or adjusted under 35 U.S.C. 154(b) by 78 days.

(21) Appl. No.: 12/027,041

(22) Filed: Feb. 6, 2008

(65) Prior Publication Data

US 2008/0235963 A1  Oct. 2, 2008

(30) Foreign Application Priority Data

Mar. 29, 2007  (HK) .................................. 07103408

(51) Int. Cl.
*G01C 15/00*  (2006.01)

(52) U.S. Cl. .................................... 33/291; 33/DIG. 21

(58) Field of Classification Search .................... 33/281, 33/282, 283, 284, 285, 286, 291, 391, 398, 33/DIG. 21; 356/250
See application file for complete search history.

(56) References Cited

U.S. PATENT DOCUMENTS

| | | | | |
|---|---|---|---|---|
| 5,617,202 | A * | 4/1997 | Rando | 356/138 |
| 6,035,540 | A * | 3/2000 | Wu et al. | 33/286 |
| 6,133,996 | A * | 10/2000 | Plumb et al. | 356/138 |
| 6,763,596 | B1 * | 7/2004 | Puri et al. | 33/286 |
| 7,031,367 | B2 * | 4/2006 | Marshall et al. | 372/109 |
| 7,392,591 | B2 * | 7/2008 | Milligan et al. | 33/286 |
| 7,513,052 | B2 * | 4/2009 | Milligan et al. | 33/290 |
| 2006/0013278 | A1 * | 1/2006 | Raskin et al. | 372/109 |
| 2006/0016084 | A1 * | 1/2006 | Liao et al. | 33/286 |

FOREIGN PATENT DOCUMENTS

| EP | 1975559 A2 * | 1/2008 |
|---|---|---|
| JP | 2009085909 A * | 4/2009 |

\* cited by examiner

*Primary Examiner*—R. Alexander Smith
(74) *Attorney, Agent, or Firm*—Wesley W. Muller

(57) ABSTRACT

This invention relates to a pendulum assembly within a laser levelling apparatus. In use, the assembly is rotatably mounted with the levelling device to hang under the effect of gravity such that opposed light emitting devices produce light on a horizontal plane. The assembly includes a main body rotatably mountable in the levelling apparatus and at least two light emitting devices mounted in or on light emitting mounting portions. At least one of the light emitting mounting positions is rotatably mounted to the main body and adjustable in its orientation with respect to the main body by an threaded adjustment means. Once one light emitting device is mounted, the adjustable one can be brought into a substantially co-linear position by movement of the threaded adjustment means. A further embodiment includes a further light emitter acting on a reflective surface to provide a substantially vertical light. Such a further embodiment fixes the position of the further emitter and reflective surface and provides adjustment mean on both other light emitting device mounting portions to arrange these co-linear to each other and transverse to the reflected light beam.

10 Claims, 3 Drawing Sheets

LASER LEVEL ASSEMBLY

FIELD OF THE INVENTION

This invention relates to an assembly for a laser level and, in particular, although not necessarily solely, an assembly acting as a pendulum within a laser levelling apparatus to hold the light emitting devices. The present invention also relates to a laser level comprising a pendulum assembly.

BACKGROUND TO THE INVENTION

A number of laser levels already exist. A common form of such levelling apparatus uses a pendulum assembly inside an outer main body to carry the light emitting devices. One example of such an assembly is shown in FIGS. 1 and 2 of the drawings.

The inner pendulum assembly 100 provides a main body 101 mounted to rotate about its mounting axis defined by a blade edge 102 under the effect of gravity such that the assembly is residing in a substantially vertical plane. Light emitting devices 103 and 104 are provided and connected to the main body to emit light substantially transverse to the plane of the main body. Associated driving circuitry 107 is also connected to the main body.

Two adjustments are necessary in such an assembly. The first of these involves ensuring the light emitting devices, mounted on opposed sides of the main body, are substantially co-linear. To reduce costs, the main body itself may be cast or otherwise formed without high tolerances. Once the light emitting devices 103 and 104 are fitted substantially opposite each other, each needs to be adjusted to ensure the beam of light emitted is substantially parallel with the other. Hence adjustment mechanisms 105 and 106 are provided to bear on the casing of the light emitting devices and push the casing into alignment with the opposed device.

The second form of adjustment is to ensure the co-linear beams from the level emit substantially horizontally. It will be appreciated that the co-linear beams may be at a slight angle to the horizontal if the gravity aligned main body rests in a position pulling one beam up and the other down from their intended positions. These may be brought into alignment by adjusting the centre of gravity of the pendulum assembly 100 through the rotation of adjusting weights 108 and 109 to draw these towards or away from a axis of rotation of the main body.

Such adjustments all introduce extra work in fitting the light emitting devices and producing a pendulum assembly that is suitable for work conditions. Furthermore, each additional adjustment mechanism provides the possibility of the level losing adjustment over time and requiring recalibration.

OBJECT OF THE INVENTION

It is an object of the present invention to provide a laser level assembly which may overcome some of the disadvantages of the prior art by providing an alternative form or arrangement for mounting and adjusting the light emitting devices or at least provide the public with a useful choice.

SUMMARY OF THE INVENTION

Accordingly, in the first aspect, the invention may broadly be said to consist in a laser level assembly comprising:
 a main body;
 at least two light emitting device mounting portions arranged substantially opposite each other around the circumference of the main body;
 a main body mounting for the main body to be rotatably mounted within a housing of the laser level such that the main body may reside on a substantially vertical plane rotatable under the effect of gravity; and
 at least one moveable weight attached to the main body that may be moved between stable positions to adjust the position of the main body under gravity around its rotatable mounting;
 wherein at least one of said light emitting device mounting portions is hingedly mounted to the main body and rotatable in the plane of the housing, and wherein said at least one of said light emitting device mounting portions is adjustable to fixed positions in that rotation within the plane of the housing to bring the light emitting device into a substantially co-linear alignment with a light emitting device on an opposed side of said main body.

By providing a pendulum with a at least one of said light emitting device mounting portions which is hingedly or rotatably mounted to the main body, the beam emission linearity of the pair of light emitting devices can be adjusted by aligning the hinge or rotational angle of one of the mounting portions, thereby saving alignment time.

The main body mounting may comprise a transverse aperture through the main body near the circumference of the main body and substantially bisecting said two light emitting device mounting portions The said main body mounting may further include a rotatable bearing within said aperture.

Alternatively, the main body mounting may be a blade member comprising a blade edge which is parallel to the axis of rotation of the main body of the pendulum.

The main body mounting may comprise a transverse aperture through the main body near the circumference of the main body and substantially bisecting said two light emitting device mounting portions Preferably said main body mounting further includes a rotatable bearing within said aperture.

Preferably said rotatably mounted light emitting device mounting portion is rotatably mounted to said main body at one point on the main body and adjustably moveably mounted with respect to the main body at a distal point on the main body.

Preferably said adjustable moveable mounting of said light emitting device mounting portion includes a threaded adjustment to adjust to fix the distance between the main body and the light emitting device mounting portion.

Preferably said moveable weight comprises at least one threaded portion acting within a co-operating aperture substantially transverse to the axis of rotation of the main body mounting.

Preferably said assembly includes a circuit board having driving circuitry for said light emitting devices.

Accordingly, in a second aspect, the invention may broadly be said to consist in an a laser level assembly comprising:
 a main body having a generally circular configuration;
 a main body mounting for the main body to be rotatably mounted with a body of the laser level such that the main body may reside on a substantially vertical plane rotatable under the effect of gravity;
 two light emitting device mounting portions arranged substantially opposite each other around the main body circumference;
 a further light emitting device mounted on a perimeter of said main body;

a reflective surface mounted on a perimeter of said main body substantially above said main body mounting axis in use and in line with said further light emitting device so as to reflect light from said further light emitting device substantially vertically in use and transverse to said two light emitting devices;

at least one moveable weight attached to the main body that may be moved between stable positions to adjust the position of the main body under gravity around its rotatable mounting; and wherein both of said two light emitting device mounting positions are rotatably mounted to the main body to rotate in the plane of the main body and adjustable to fixed positions in that rotation to bring the light emitting devices into a substantially co-linear position with each other and substantially transverse to said reflected light from said reflective surface.

Preferably said assembly further includes a circuit board containing driving circuitry for said light emitting devices provided adjacent said further light emitting device.

Preferably said assembly includes a counterweight on a substantially opposite side of said main body from said further light emitting device to counterbalance for the offset weight of the further light emitting device.

BRIEF DESCRIPTION OF THE DRAWINGS

Preferred embodiments of the invention will now be described with reference to the following drawings in which.

DETAILED DESCRIPTION OF PREFERRED EMBODIMENTS

This invention relates to a laser level assembly and is generally described with reference to a pendulum assembly mounted within such laser levels. The remainder of the laser level outside of this assembly is not described herein as such is already well known to those skilled in the art and an example of such is currently available in the marketplace as the "Bullseye" level marketed by the applicant.

Figure 3:
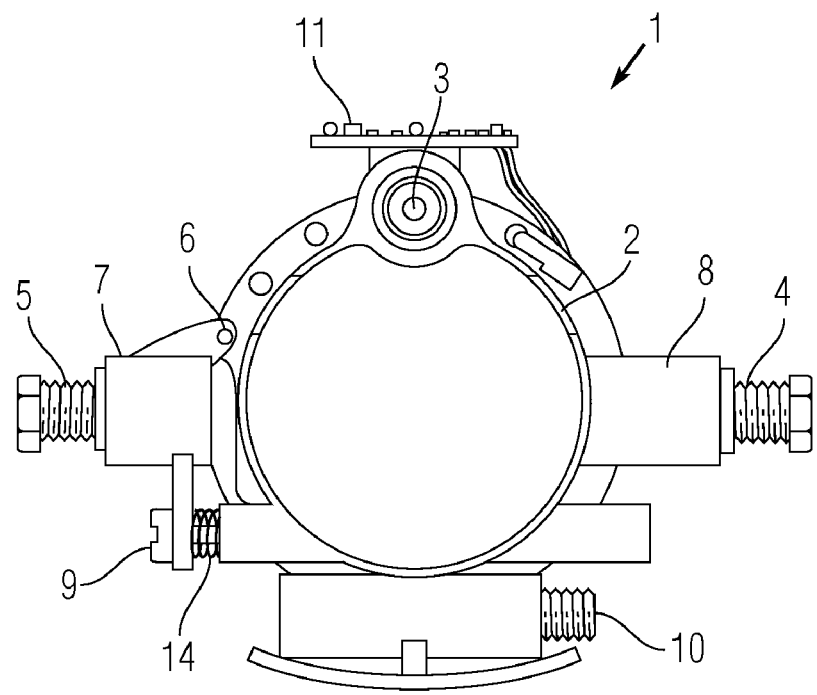
FIG. 3 shows a front elevation of a laser level assembly in accordance with a first embodiment of the invention.
Figure 4:
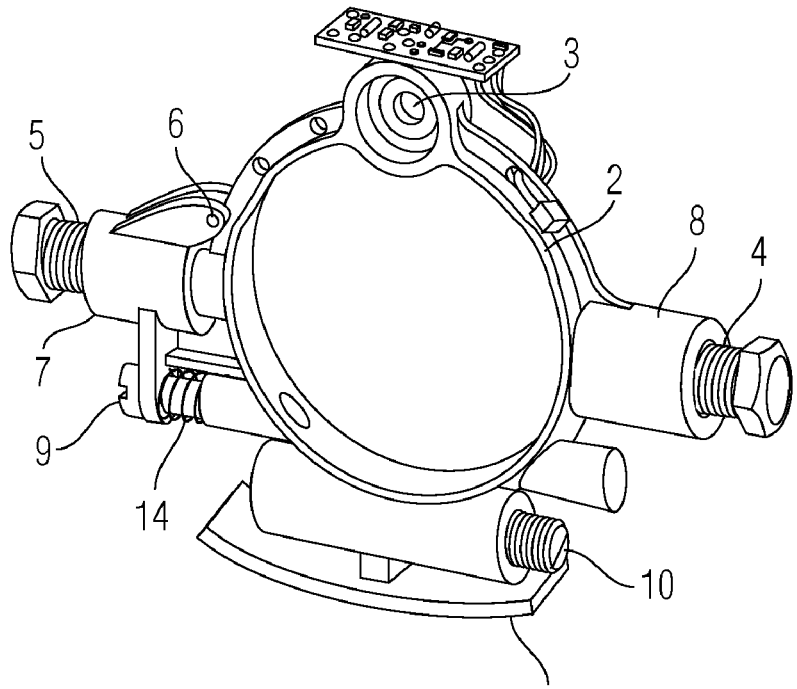
FIG. 4 shows a perspective view of the embodiment of FIG. 3.

Referring to the Figures, a first embodiment of the invention is shown in FIGS. 3 and 4. The laser level assembly 1 is shown having a main body 2 which comprises a generally circular member when viewed in elevation or when viewed along the axis of rotation of the main body. As shown in the Figures, the circular body is substantially symmetrical about the axis of rotation.

Figure 1:
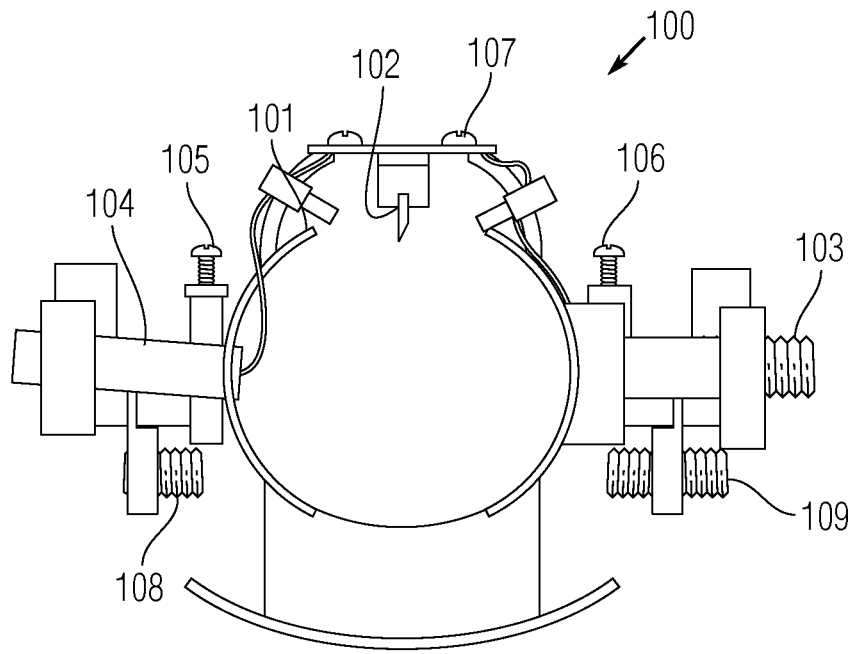
FIG. 1 shows a front elevation of a laser level assembly in accordance with a prior art device.
Figure 2:
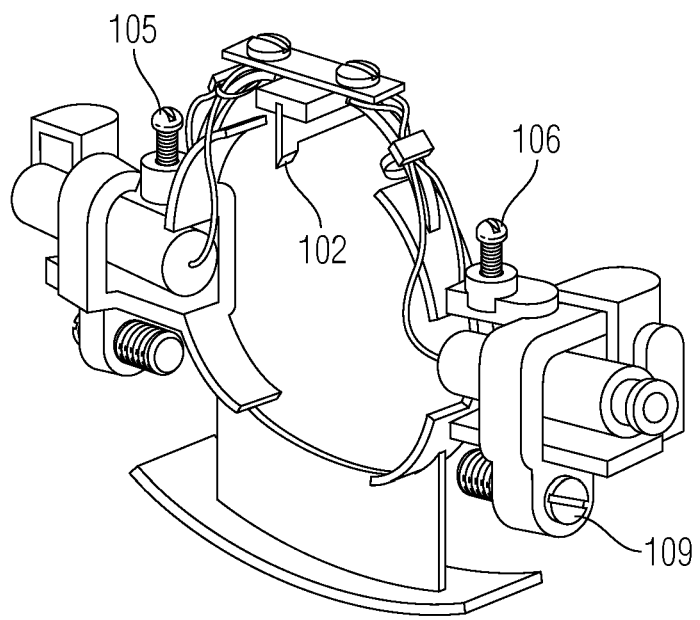
FIG. 2 shows a perspective view of the prior art device of FIG. 1.

The main body is rotatably mountable within the laser level housing by the aperture 3 provided near the top of the main body. A rotatable bearing is provided within this aperture to permit rotational movement of the main body 2 with the laser level housing. The centre of the bearing defines the axis of rotation about which the main body is rotatable. The main body itself is orientated by gravity to reside in a vertical plane transverse to the axis through aperture 3. Alternatively, the main body 2 may be supported on the laser level housing by means of a blade member having a blade edge parallel to the axis of rotation, similar to a blade member 102 s shown in FIG. 1. With such arrangements, the main body will swing about the blade edge or the bearing upon disturbance of gravitational equilibrium of the main body about the axis of rotation, and the main body will subsequently come to rest at a position corresponding to gravitational balance or equilibrium of the main body about the axis of rotation. A rotatable bearing, such as a ball bearing, will provide the advantage of a better defined two-dimensional rotational plane, while the use of a blade edge as a pivotal support of the main body of the pendulum will allow a higher degree of rotational freedom for the pendulum.

Two light emitting devices with their own casings 4 and 5 are mounted respectively on light emitting device mountings 8 and 7 at substantially opposite sides of the main body. The axis of mounting of the main body defined by the bearing within aperture 3 substantially bisect the position of these two light emitting device mountings 7 and 8 about the perimeter of the main body to allow the mountings to direct the light emitted from the light emitting devices in substantially horizontal positions once the assembly is mounted on its mounting axis.

As can be seen, the light emitting device mounting 8 is fixed in position with respect to the main body. Similarly, the light emitting device may be fixed within this mounting to provide a light directed radially outwards from the main body and substantially horizontal.

Due to the limitations of manufacture and fitting of the light emitting devices 4 & 5 onto the main body, some adjustment to the angle of emission of at least one of the light emitting devices is required. This is provided on the other light emitting device mounting 7.

The light emitting device mounting 7 is rotatably mounted by a pivotal mounting 6 to rotate in the plane of the main body 2. The mounting 7 is supported at a distal point on the main body 2 by a threaded adjustment 9 acting through an appendage from the mounting 7. The adjustment means 9 is a threaded adjustment in the form of a screw or bolt although other moveable adjustment mechanisms could also be used. A spring 14 simply biases the mounting 7 against the adjustment mechanism 9 so that movement of the screw or bolt forming the mechanism 9 will rotate the mounting 7 about the pivot 6. Such movement may allow the light emitting device 5 to be adjusted such that its optical output is substantially co-linear although radially opposed to that of the fixed light emitter 4.

A moveable weight in the form of a threaded portion 10 within a co-operating aperture is also provided to move the weight with respect to a vertical line through the axis of rotation and allow the entire main body 2 to rotate to a position whereby the co-linear beams of light from the emitters are horizontal.

In adjusting such a device, it will be appreciated that the initial constraints involve the fixed position of the emitter 4 and its orientation with respect to the axis through aperture 3. Adjustment of the screw or bolt forming adjustment means 9 allows the output of the light emitters 4 and 5 to become substantially co-linear whereas adjustment of the weight 10 rotates the entire main body to bring the co-linear beams to the horizontal.

The accuracy or sensitivity of the equilibrium position of the pendulum could be enhanced by having its centre of gravity located well below the axis of rotation, since a larger distance between the centre of gravity of the pendulum and the axis of rotation would mean a larger torque for moving the pendulum into gravitational equilibrium. To ensure the centre of gravity of the main body is well below that of the axis through aperture 3, additional fixed weight in the form of the main body portion 12 may be provided, and this weight is located well below the light emitting devices 4&5 and near the bottom of the circular main body.

A circuit board 11 may also be provided on the main body 2 to carry the driving circuitry for the light emitting devices which themselves are solid state devices such as LED's.

Figure 5:
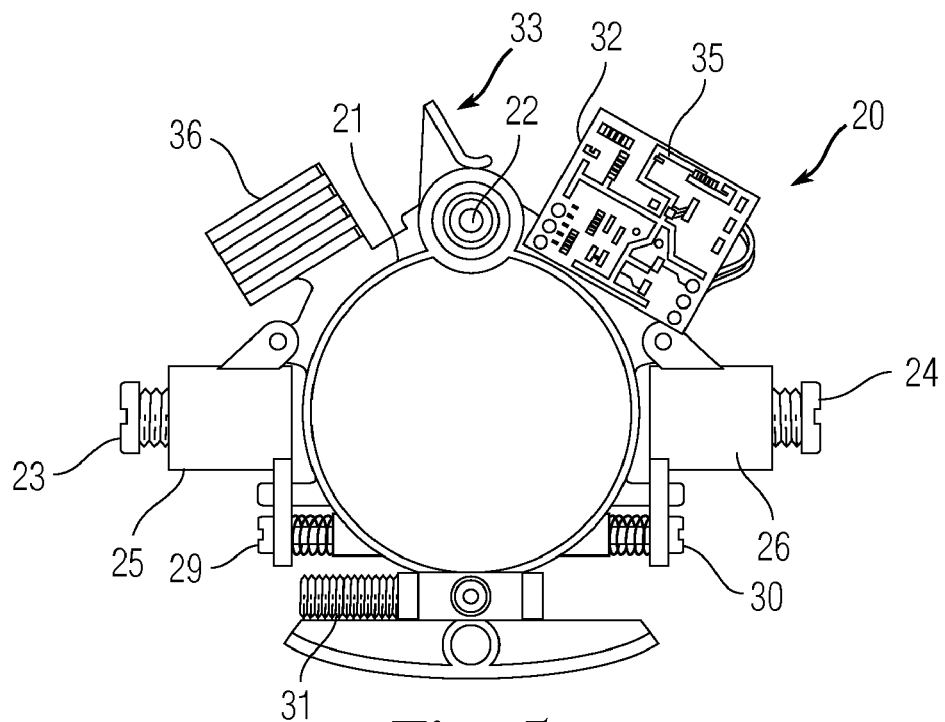
FIG. 5 shows a front elevation of a laser level assembly in accordance with a further embodiment of the invention.
Figure 6:
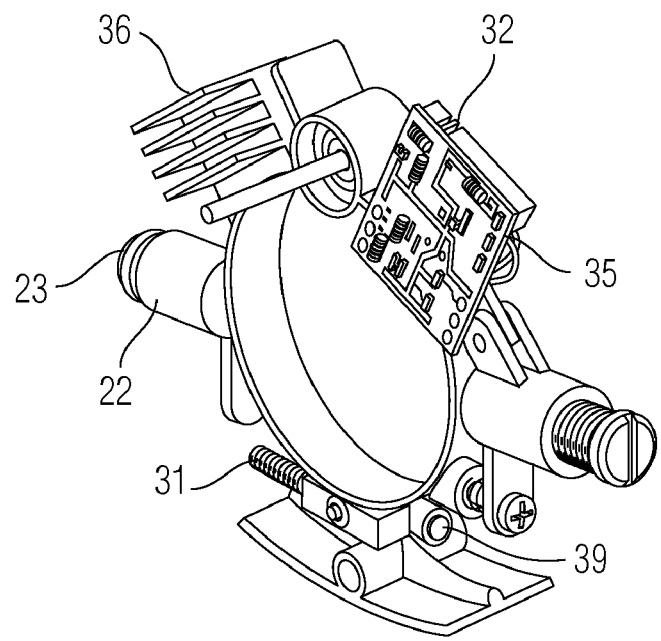
FIG. 6 shows a perspective view of the embodiment of FIG. 5.

Referring to FIGS. 5 and 6, a yet further embodiment is shown as assembly 20. In this embodiment, the main body 21 is little different from that previously and its mounting in use is the same through an aperture 22 in a bearing in the perimeter of the main body.

Also as with the earlier embodiment, two light emitters 23 and 24 are provided on substantially opposed sides of the main body and an adjustable weight 31 is provided to bring the main body into the required alignment to emit these beams substantially horizontally.

However, in this embodiment, a further light emitting device 32 is provided and fixed to the main body. This light emitting device directs a beam of light towards a reflective surface 33 also fixed on the main body. The reflected beam of light is intended to provide a vertical light in use.

Due to the position of both the light emitter 32 and the reflective surface 33 determining the angle at which the resultant reflected beam emits radially from the main body, both these are fixed with respect to the axis through aperture 22.

This line is then taken as the starting point for adjustment of the mountings 25 and 26 of the light emitters 23 and 24.

In contrast to the previous embodiment, the light emitting device mountings 25 and 26 are both rotatably mounted with respect to the main body 21 and adjustable through adjustment means 29 and 30 in the same manner as described previously with respect to the adjustment means 9. In this case both adjustments are used to bring both light beams to emit transverse to the vertical orientation of the reflected beam.

Once again, the 3 beams, once assuming positions at successive 90 degree positions about the main body, can be adjusted to the vertical and horizontal positions desired by adjustment of the weight 31.

A larger circuit board for the driving circuits may also be provided and positioned adjacent the emitter 32.

It will be appreciated that the positioning of the reflective surface 33 directly above the axis of mounting through aperture 22 causes the associated emitter 32 to be offset from this axis. The weight of this emitter and its mounting together with the circuit board 35 can be generally offset by a counterweight 36 on the main body on an opposed side of the axis through aperture 22. Any fine adjustment in the balance due to differences in weight between these items is also accounted for in adjusting the weight 31.

Thus it can be seen that the laser level is provided with an assembly in which the minimum of adjustments are provided to ensure the accuracy of the beams emitted while relaxing the need for high tolerance manufacture of the main body itself.

This invention has been described by means of preferred embodiments which should not be considered limiting to the generality of the description itself. Specific integers referred to throughout the description deem to include known equivalents where appropriate.

The invention claimed is:

1. A laser level assembly comprising:
   a main body;
   at least two light emitting device mounting portions arranged substantially opposite each other around the circumference of the main body;
   a main body mounting for the main body to be rotatably mounted within a housing of the laser level such that the main body may reside on a substantially vertical plane rotatable under the effect of gravity; and
   at least one moveable weight attached to the main body that may be moved between stable positions to adjust the position of the main body under gravity around its rotatable mounting;
   wherein at least one of said light emitting device mounting portions is hingedly mounted to the main body and rotatable in the plane of the housing, and wherein said at least one of said light emitting device mounting portions is adjustable to fixed positions in that rotation within the plane of the housing to bring a light emitting device into a substantially co-linear alignment with a light emitting device on an opposed side of said main body.

2. A laser level assembly as claimed in claim 1 wherein said main body mounting comprises a transverse aperture through the main body near the circumference of the main body and substantially bisecting said two light emitting device mounting portions.

3. A laser level assembly as claimed in claim 2 wherein said main body mounting further includes a rotatable bearing within said aperture.

4. A laser level assembly as claimed in claim 1 wherein at least one of said rotatably mounted light emitting device mounting portions is rotatably mounted to said main body at one point on the main body and adjustably moveably mounted with respect to the main body at a distal point on the main body.

5. A laser level assembly as claimed in claim 4 wherein at least one of said adjustable moveable mounting portions of said light emitting device mounting portion includes a threaded adjustment to adjust to fix the distance between the main body and the light emitting device mounting portion.

6. A laser level assembly as claimed in claim 1 wherein said moveable weight comprises at least one threaded portion acting within a co-operating aperture substantially transverse to the axis of rotation of the main body mounting.

7. A laser level assembly as claimed in claim 1 wherein said assembly includes a circuit board having driving circuitry for said light emitting devices.

8. A laser level assembly comprising:
   a main body having a generally circular configuration;
   a main body mounting for the main body to be rotatably mounted with a body of the laser level such that the main body may reside on a substantially vertical plane rotatable under the effect of gravity;
   two light emitting device mounting portions arranged substantially opposite each other around the main body circumference;
   a light emitting device mounted on a perimeter of said main body;
   a reflective surface mounted on a perimeter of said main body substantially above said main body mounting axis in use and in line with said further light emitting device so as to reflect light from said light emitting device substantially vertically in use and transverse to said two light emitting devices;

at least one moveable weight attached to the main body that may be moved between stable positions to adjust the position of the main body under gravity around its rotatable mounting; and wherein both of said two light emitting device mounting positions are rotatably mounted to the main body to rotate in the plane of the main body and adjustable to fixed positions in that rotation to bring the light emitting devices into a substantially co-linear position with each other and substantially transverse to said reflected light from said reflective surface.

9. A laser level assembly as claimed in claim 8 wherein said assembly further includes a circuit board containing driving circuitry for said light emitting devices provided adjacent said further light emitting device.

10. A laser level assembly as claimed in claim 8 wherein said assembly includes a counterweight on a substantially opposite side of said main body from said further light emitting device to counterbalance for the offset weight of the further light emitting device.

* * * * *